United States Patent [19]

Heslinga et al.

[11] 3,862,972

[45] Jan. 28, 1975

[54] PROCESS FOR PREPARING UNSATURATED CARBOXYLIC ACIDS

[75] Inventors: Lammert Heslinga, Maasluis; Hendrik Jacob Johannes Pabon; David Adriaan van Dorp, both of Vlaardingen, all of Netherlands

[73] Assignee: Lever Brothers Company, New York, N.Y.

[22] Filed: Mar. 20, 1972

[21] Appl. No.: 236,235

[30] Foreign Application Priority Data
Mar. 25, 1971  Great Britain .................. 7774/71

[52] U.S. Cl. ............ 260/413, 260/345.7, 260/408, 260/410.9 R, 260/484 R, 260/486 H, 260/526 N, 260/539 R
[51] Int. Cl. ........................................... C08h 17/36
[58] Field of Search .................. 260/413, 526 N

[56] References Cited
UNITED STATES PATENTS

| | | | |
|---|---|---|---|
| 1,963,935 | 6/1934 | Carothers et al. ............... | 260/526 N |
| 3,033,884 | 5/1962 | Osbond et al. .................... | 260/413 |
| 3,412,114 | 11/1968 | Fernholz et al. .................. | 260/404 |

FOREIGN PATENTS OR APPLICATIONS

| | | | |
|---|---|---|---|
| 1,115,641 | 5/1968 | Great Britain | |
| 909,354 | 10/1962 | Great Britain ................... | 260/413 |

OTHER PUBLICATIONS

Rec. Trav. Chim. 87, 1968, pg. 466.
Journ. Amer. Chem. Soc., 46, 1969, pg. 269.
Journ. Amer. Oil. Chem. Soc., 41, 1964, pp. 241–247.
Kovalev et al., C.A. 72:78324, 1970.

*Primary Examiner*—Lewis Gotts
*Assistant Examiner*—Ethel G. Love
*Attorney, Agent, or Firm*—Lever Brothers Company

[57] ABSTRACT

Acids of the structure $RCH_2(C\equiv CCH_2)_m(CH_2)_nCH=CHCOOH$ where R is a monovalent aliphatic radical, $m$ is 0 and $n$ is 0, or $m$ is 1 to 5 and $n$ is 1 to 6, are prepared by condensation of a Grignard reagent $RMgBr$ with an acid $BrCH_2(C\equiv CCH_2)_m(CH_2)_nCH=CHCOOH$. The resulting enynoic acids are useful as intermediates, especially in the preparation of prostaglandin precursors, such as arachidonic acid.

10 Claims, No Drawings

PROCESS FOR PREPARING UNSATURATED CARBOXYLIC ACIDS

This invention relates to a process for preparing unsaturated carboxylic acids, and to new carboxylic acids having both ethylenic and acetylenic unsaturation.

Certain unsaturated fatty acids having skipped double bond systems are of importance as essential fatty acids, which are precursors in prostaglandin biosynthesis. The most important such acids are eicosa-8c, 11c, 14c-trienoic acid (bishomo-γ-linolenic acid) and eicosa-5c, 8c, 11c, 14c-tetraenoic acid (arachidonic acid), which are the precursors of $PGE_1$ and $PGE_2$, respectively. (The designations c and t are here used to indicate cis and trans configuration.) Other related acids that are precursors in the biosynthesis of prostaglandins having valuable pharmacological properties are heneicosa-8c, 11c, 14c-trienoic and eicosa-2t, 8c, 11c, 14c-tetraenoic acids, which are converted by means of prostaglandin synthetase into ω-homo-$PGE_1$ and 2t-dehydro-$PGE_1$, respectively. Considerable research effort has been directed to the synthesis of such unsaturated fatty acids, and methods have been developed which involve multi-stage synthesis. The present invention is concerned with a process for making unsaturated fatty acids by which there can be obtained intermediates capable of conversion by a single stage process into such prostaglandin precursors and related acids.

The process of this invention is directed to the preparation of fatty acids having ethylenic unsaturation at the αβ-position. It has been found difficult to prepare by standard methods such acids having cis-ethylenic bonds at other positions in the molecule, for isomerisation leading to trans acids is liable to occur. Thus it has been found that when hex-3c-enal is condensed with malonic acid under Knoevenagel conditions in an attempt to prepare octa-2t, 5c-dienoic acid, only the 2t, 4t-acid is produced. Furthermore, attempts to prepare dodeca-2t, 5c-dienoic acid by a route through dodec-2t-en-5-yn-1-ol by oxidation to the corresponding enynoic acid using various oxidation methods have been unsuccessful. French Pat. No. 1,322,911 describes the condensation of 6-(2'-tetrahydropyranyl)oxyhexylmagnesium chloride with ethyl 4-bromocrotonate at from 0° C to ambient temperature, but it has been found that a reaction under these conditions between an organomagnesium halide having a $CH_2$ group in the α-position and 4-bromocrotonic acid or its ester gives very unsatisfactory results because the product is mainly one containing an α-vinyl substituent arising by an allylic rearrangement. Condensation reactions using Grignard reagents for the preparation of acetylenic carboxylic acids have been described, for instance in British Pat. Nos. 895,897 and 909,354, but the acids concerned contain no αβ-ethylenic bond.

It has now been found that a wide range of 2t-enoic acids can readily be prepared in good yield by the condensation of a Grignard reagent with a 2t-enoic acid carrying an activated halogen atom in the ω-position, provided that where a Grignard reagent with no unsaturation at the αcarbon atom is condensed with a 4-bromocrotonic acid compound, the temperature of reaction is maintained at below −20°C. By this means it has proved possible to introduce with the Grignard reagent a group carrying acetylenic unsaturation in a wide variety of positions: the intermediate produced can then be converted by selective hydrogenation into acids with the desired cis-ethylenic bond system, with or without a trans-ethylenic bond in the αβ-position.

A process of the invention is one for preparing an unsaturated carboxylic acid of the structure $RCH_2(C \equiv CCH_2)_m(CH_2)_nCH\overset{t}{=}CHCOOH$, where R is a monovalent aliphatic radical and $m$ is 0 or an integer from 1 to 5 and $n$ is 0 or an integer from 1 to 6, $n$ being 0 when $m$ is 0, comprising contacting a Grignard reagent RMgBr with an ω-halogeno-2t-enoic acid of the structure $BrCH_2(C \equiv CCH_2)_m(CH_2)_nCH\overset{t}{=}CHCOOH$, in an inert liquid medium whose temperature is restricted to below −20° C if in the reagents selected the bonds of the αcarbon atom of the group R are all single bonds and $m$ and $n$ are 0, and recovering from the medium the acid formed. Equivalent reagents in which one or both Br atoms are replaced by Cl or I can also be employed.

The group R can be an alkanyl (saturated alkyl), alkenyl, or alkynyl group, or it can be a monovalent aliphatic hydrocarbon radical having multiple unsaturated bonds. R is preferably an n-alkynyl or n-alkapolyynyl group. It can have a —$CH_2$— group in the α-position, but preferably it has an αβ-acetylenic bond, for the corresponding acetylene RH is readily converted into a Grignard reagent by reaction at the active hydrogen atom with ethylmagnesium bromide, and gives good yields of the acid product at ambient temperature. It can be a substituted group whose substituent is sufficiently inert to the Grignard reagent, and the substituent is preferably an alkoxy group, for instance a lower alkoxy group, such as a methoxy group, or a 2'-tetrahydropyranyloxy group.

Typical examples of groups R of Grignard reagents used in the reaction are ethyl, butyl, amyl, heptyl, but-1-ynyl, pent-1-ynyl, hept-1-ynyl, oct-1-ynyl, hepta-1,4-diynyl, octa-1,5-diynyl, nona-1,6-diynyl, deca-1,4-diynyl, deca-1,4,7-triynyl, undeca-1,4-diynyl, undeca-1,4,7-triynyl, trideca-1,4,7,10-tetraynyl, trideca-1,4,7,-triynyl, tetradeca-1,4,7-triynyl, hexadeca-1,4,7,10-tetraynyl, hexadeca-1,4,7,10,13-pentaynyl, and heptadeca-1,4,7,10-tetraynyl groups: and 3-methoxyprop-1-ynyl, 3-(2'-tetrahydropyranyl)oxyprop-1-ynyl, 6-methoxyhexa-1,4-diynyl, and 6-(2'-tetrahydropyranyl)oxyhexa-1,4-diynyl groups. Hence groups R having the structure $R^1(CH_2C \equiv C)_p$— where $R^1$ is an n-alkanyl group and $p$ is from 0 to 5, and groups R having the structure $R^2(CH_2C \equiv C)_q$— in which $R^2$ is an alkoxy or 2-tetrahydropyranyloxy group and $q$ is from 1 to 2, are particularly concerned. A branched-chain aliphatic group can be used if desired. Preferably the Grignard reagent is an organomagnesium bromide.

The ω-halogeno-enoic acid is preferably one where $m$ and $n$ are each 0, that is to say, it is a 4-halogenocrotonic acid: in such an acid the halogen atom is sufficiently activated by the presence of the ethylenic bond and its neighbouring carboxylic acid group to undergo the condensation in high yield. It is convenient to employ 4-bromocrotonic acid. Examples of other halogeno-enoic acids which can be used are a 7-halogenohept-2t-en-5-ynoic acid (an acid of the above structure where $m$ are 1 and $n$ is 0), a 10-halogenodec-2t-en-5,8-diynoic acid (where $m$ is 2 and $n$ is 0), and a 10-halogenodec-2t-en-8-ynoic acid (where $m$ is 1 and $n$ is 3). Again, it is convenient to use such acids in which the halogen atom is a bromine atom: the halogen atom is activated in the condensation by the neighbouring acetylenic bond.

In order to obtain a product containing a skipped unsaturated bond system, a combination of Grignard reagent and halogeno-enoic acid is chosen which provides the necessary number of skipped unsaturated bonds in the positions desired, for instance in the 8,11,14-, 5,8,11,14-, and 5,8,11,14,17-positions: where acetylenic bonds are introduced these can then be converted to cis-ethylenic bonds by a subsequent selective hydrogenation step using Lindlar catalyst as described in British Patent Specification No. 7775/71. The group R (excluding any substituent) and the halogeno-enoic acid together will generally have from 5 to 22 carbon atoms; the unsaturated acids which are precursors for the most active prostaglandins have 20 or 21 carbon atoms, and preferably the group R and the halogeno-enoic acid together have 20 or 21 carbon atoms.

Eicos-2t-en-8,11,14-triynoic acid as intermediate for the production of the prostaglandin precursors eicosa-8c, 11c, 14c-trienoic and eicosa-2t, 8c, 11c, 14c-tetraenoic acids can be obtained by the condensation of:

a. deca-1,4-diynylmagnesium bromide with 10-bromodec-2t-en-8-ynoic acid, where $m$ is 1 and $n$ is 3;
b. hept-1-ynylmagnesium bromide with 13-bromotridec-2t-en-8,11-diynoic acid, where $m$ is 2 and $n$ is 3; and
c. butylmagnesium bromide with 16-bromohexadec-2t-en-8,11,14-triynoic acid, where $m$ is 3 and $n$ 3.

Heneicos-2t-en-8,11,14-triynoic acid as intermediate for the prostaglandin precursor heneicosa-8c, 11c, 14c-trienoic acid can be obtained by similar condensations in which the Grignard reagents have one additional methylene group at the terminal methyl end.

Eicos-2t-en-5,8,11,14-tetraynoic acid as intermediate for arachidonic acid can be obtained by the condensation of:

a. hexadeca-1,4,7,10-tetraynylmagnesium bromide with 4-bromocrotonic acid, where $m$ is 0 and $n$ is 0;
b. trideca-1,4,7-triynylmagnesium bromide with 7-bromohept-2t-en-5-ynoic acid, where $m$ is 1 and $n$ is 0;
c. deca-1,4-diynylmagnesium bromide with 10-bromodec-2t-en-5,8-diynoic acid, where $m$ is 2 and $n$ is 0;
d. hept-1-ynylmagnesium bromide with 13-bromotridec-2t-en-5,8,11-triynoic acid, where $m$ is 3 and $n$ is 0; and
e. butylmagnesium bromide with 16-bromohexadec-2t-en-5,8,11,14-tetraynoic acid, where $m$ is 4 and $n$ is 0.

Eicos-2t-en-5,8,11,14,17-pentaynoic acid as intermediate for eicosa-5c, 8c, 11c, 14c, 17c-pentaenoic acid can be obtained by the condensation of the corresponding pairs of Grignard reagents and halogeno-enoic acids having 16 and 4, 13 and 7, 10 and 10, 7 and 13, and 4 and 16 carbon atoms, respectively.

The Grignard reagents containing acetylenic bonds can be prepared by standard reactions such as the coupling of acetylenic compounds to give di-, tri-, tetra- and penta- ynes. The halogeno-enoic acids containing acetylenic bonds can be prepared by the condensation of 4-bromocrotonic acid with appropriate acetylenic compounds using the process of this invention followed by introduction of halogen at the ω-position. Thus, for example, an ω-halogeno-2t-enoic acid of the above structure where $m$ is 1 and $n$ is 3, can be obtained by the stepwise conversion of pent-1-yn-5-ol to the 5-bromo-compound, addition of formaldehyde to the terminal carbon atom of the acetylenic group, protection of the resulting hydroxy group with dihydropyran, followed by condensation with bromocrotonic acid, and replacement of the protecting tetrahydropyranyl group with phosphorous tribromide to give 10-bromodec-2t-en-8-ynoic acid. Other ω-halogeno-2t-enoic acid intermediates where $m$ is from 1 to 4 can be obtained by stepwise 3-carbon chain-lengthening of 4-bromocrotonic and 10-bromodec-2t-en-8-ynoic acids, by condensing them with tetrahydropyranyloxypropylmagnesium bromide using a process of the invention, followed by bromination with phosphorus tribromide.

The reagents in the condensation reaction are brought together in a suitable solvent, for instance tetrahydrofuran. The condensation reaction with a Grignard reagent containing the group $-CH_2Mg-X$ is preferably conducted at from $-25°$ to $-70°$ C, and especially at from $-50°$ to $-70°$ C, with addition of the Grignard reagent slowly to the bulk of halogeno-enoic acid. Where the Grignard reagent contains the group $-C \equiv CMg-X$, the condensation reaction is less vigorous and is preferably carried out in the presence of copper or a cuprous salt as catalyst; the employment of cuprous cyanide is convenient, and cuprous chloride is another salt that can be used: the reaction then proceeds at ambient temperature to give high yields of the condensation product. The use of elevated temperatures for long periods, for instance by refluxing in tetrahydrofuran solution for 24 hours, results in partial isomerisation at the ethylenic bond and is therefore to be avoided.

An excess of the Grignard reagent is necessary in order to convert the free acid group of the halogeno-enoic acid to a magnesium halide derivative, but as the free acid group reacts more readily than the activated halogen atom, in order to conserve the less readily available acetylenic compounds, it is possible to convert the acid initially into the corresponding carboxymagnesium halide by the use of an appropriate amount of ethylmagnesium bromide, and then to add one molar equivalent of the acetylenic Grignard reagent which it is desired to condense with the halogeno-enoic acid. The carboxymagnesium halide group is in effect a protecting group for the free carboxyl group while reaction takes place at the other end of the molecule, and after the reaction the free carboxyl group is regenerated by simple hydrolysis as with any other complex from a Grignard addition reaction. It is to be understood that to conserve Grignard reagent the free carboxylic acid group can, if desired, initially be converted to any suitable protected carboxylica acid group where the protection will remain under the conditions of the condensation reaction with the Grignard reagent. Thus, the carboxylic acid can be used in the form of an ester, provided the temperature of the condensation reaction is sufficiently low for the ester group not to react with the Grignard reagent. The carboxylic acid can be used in the form of its adamantyl orthoester and the condensation then carried out at ambient temperature: even the methyl or ethyl ester can be employed at 0° C. Since the carboxylic acid group does not take part in the condensation reaction, the use of a compound with a carboxylic acid group whether protected or not is here regarded as within the instruction to use a compound having the structure of an ω-halogeno-enoic acid as defined above. Where hydrolysis of a Grignard reaction product is required in order to regenerate the free carboxylic acid group, this can be carried out suitably using aqueous sulphuric acid.

The free acids produced by the process of the invention can, if desired, subsequently be converted into acid derivatives, for example their esters, for instance by reaction with diazomethane or with an alcohol in the presence of hydrogen chloride as catalyst.

The new unsaturated carboxylic acids of the invention are those of the structure $R^3CH_2CH\overset{t}{=}CHCOOH$, in which $R^3$ is a monovalent n-aliphatic radical containing from 1 to 5 acetylenic bonds are from 3 to 18 carbon atoms; the radical can either be an unsubstituted hydrocarbon radical or it can terminate in a group $R^4CH_2C\equiv C-$ where $R^4$ is an alkoxy or 2'-tetrahydropyranyloxy group. Preferably $R^3$ has an αβ-acetylenic bond. Preferably also $R^3$ contains from 2 to 5 skipped acetylenic bonds, that is, each acetylenic bond is separated from the next adjacent acetylenic bond by one methylene group. Examples of such acids are non-2t-en-5-ynoic, dodec-2t-en-5-ynoic, dodec-2t-en-5,9-diynoic, tridec-2t-en-5,10-diynoic, tetradec-2t-en-5,8-diynoic, heptadec-2t-en-5,8,11-triynoic, eicos-2t-en-8,11,14-triynoic, eicos-2t-en-5,8,11,14-tetraynoic, eicosa-2t-en-5,8,11,14,17-pentaynoic and heneicos-2t-en-8,11,14-triynoic acids. The last four of these acids are valuable as intermediates in the preparation of prostaglandin precursors. The acids of the invention can be converted to polyenoic acids as described in British Patent Specification No. 7775/71. The acids can, of course, be in the form of their derivatives, for instance an ester with an alcohol, for example a methyl ester.

The invention is illustrated by the following Examples, in which temperatures are in °C: IR, TLC and GLC are respectively infra red spectroscopy and thin layer and gas-liquid chromatography: THF is the solvent tetrahydrofuran.

EXAMPLE 1

A solution of ethylmagnesium bromide (23 mmol) in THF (11 ml) was added dropwise to a stirred solution of 4-bromocrotonic acid (1.65g, 10 mmol) in THF (20 ml) at −70° under nitrogen, and the reaction mixture stirred for 20 minutes at this temperature, after which the presence of the bromo-acid could no longer be detected using TLC. To the reaction mixture was added ether (50 ml), the mixture warmed to −20° and acidified to pH 3 with N sulphuric acid. Water (200 ml) was added and the reaction mixture extracted with ether: the separated ether layer was then extracted with 2N aqueous ammonia solution and the aqueous extracts acidified, re-extracted with ether, and the dried extracts evaporated to give hex-2t-enoic acid (1.3 g); a sample converted to its methyl ester by reaction with diazomethane and submitted to GLC showed the acid was 74% pure. The crude acid was submitted to column chromatography on silica using a mixture of light petroleum and ether in proportion 95 to 5 by volume as eluant, followed by two recrystallisations from light petroleum at −60°, to give the pure acid, m.p. 32°.

EXAMPLE 2

A solution of n-pentylmagnesium bromide (28.8 mmol) in THF (28 ml) was added dropwise with stirring to a solution of 4-bromocrotonic acid (2.1 g, 12.5 mmol) in THF (10 ml) at −50° under nitrogen, and the reaction mixture stirred for 20 minutes at this temperature. The product was isolated by the procedure of Example 1. Crude non-2t-enoic acid (1.95 g) was isolated; it had 55% purity by GLC after conversion by diazomethane to the methyl ester, and contained 14% 2-vinylheptanoic acid as impurity.

EXAMPLE 3 n-Heptylmagnesium bromide (23 mmol) was reacted with 4-bromocrotonic acid (10 mmol) using the procedure of Example 1, except that reaction was conducted at −50°. Undec-2t-enoic acid (1.8 g) was isolated from the reaction mixture as an oil, which was converted with diazomethane to its methyl ester and thus shown by GLC to be 71% pure; chromatography on silica followed by recrystallisation of the acid twice from light petroleum at −75° gave acid of purity 96.5%, m.p. 16–17°.

EXAMPLE 4

A solution of pent-1-yne (3.4 g, purity 95%, 47.5 mmol) in THF (10 ml) was added dropwise to a stirred solution of ethylmagnesium bromide (46 mmol) in THF (29.7 ml) at ambient temperature under nitrogen. After heating under reflux for 1 hour in order to ensure completion of conversion to pentynylmagnesium bromide, cuprous cyanide (100 mg) was added and the mixture stirred at ambient temperature for 15 minutes, then cooled in ice and a solution of 4-bromocrotonic acid (3.3 g, 20 mmol) in THF (10 ml) was added dropwise. After stirring for 30 minutes at ambient temperature the bromo-acid could no longer be detected by TLC. Ether (50 ml) was added to the reaction mixture, the mixture was cooled to −20° and acidified to pH 3 with N sulphuric acid: water (200 ml) was added and the reaction mixture extracted with ether. The ether extracts were washed with a saturated solution of ammonium chloride to complete removal of the cuprous cyanide, and the ether solution was then extracted with 2N aqueous ammonia solution, and the ammoniacal extracts acidified and re-extracted with ether, the final ether extracts after drying and evaporation giving non-2t-en-5-ynoic acid (3.1 g), m.p. 61.5°–63°, of purity 97.5% determined by conversion of a sample with diazomethane to the methyl ester followed by GLC. The product was crystallised from a mixture of light petroleum and ether in proportion 90 to 10 by volume at −50°, to give the pure acid, m.p. 63.5°–64°.

The above preparation was compared with a corresponding reaction using pentylmagnesium bromide under identical conditions. To pentylmagnesium bromide (46 mmol) in THF (29 ml) was added THF (10 ml) and cuprous cyanide (100 mg): after stirring for a few minutes 4-bromocrotonic acid (20 mmol, 3.3 g) in THF (10 ml) was added dropwise under nitrogen, with the temperature of the reaction mixture maintained at ambient using a waterbath. The mixture was stirred for 30 minutes after completion of addition and the acid product isolated as before as an oil (2.9 g). Removal of unchanged 4-bromocrotonic acid (150 mg) by crystallisation from light petroleum at −80° gave an oil (2.7 g) consisting of 2-vinylheptanoic acid (85%) and non-2t-enoic acid (9%), as shown by IR and GLC of the methyl ester.

EXAMPLE 5

Using the procedure of Example 4, oct-1-yne (5.0 g, 46 mmol) was converted to octynylmagnesium bromide and condensed with 4-bromocrotonic acid (3.3 g, 20 mmol) and the reaction mixture worked up after stirring at ambient temperature for 1 hour, when the presence of the bromo-acid could no longer be detected by TLC. There was obtained dodec-2t-en-5-ynoic acid (4.0 g) as crystals, m.p. 41°–43° of purity 94% determined by conversion of a sample with diazomethane to the methyl ester followed by GLC: after two recrystallisations from light petroleum at −75° the purified acid (3.0 g, 76.9% yield) was obtained, m.p. 44°–45°, of purity higher than 96%.

The acid slowly deteriorated even when stored at 0° under purified nitrogen. The methyl ester showed in its mass spectrum a parent peak at m/e 208 (calculated 208).

EXAMPLE 6

Octa-1,5-diyne (4.9 g, 46 mmol) was converted to the octadiynylmagnesium bromide and this was reacted with 4-bromocrotonic acid (20 mmol), using the procedure described in Example 4. Dodec-2t-en-5,9-diynoic acid (2.8 g, 74% yield), m.p. 115.5°–116° was obtained after isolation from the reaction mixture and recrystallisation from ether at −60°: a sample was converted to its methyl ester with diazomethane.

EXAMPLE 7

Using the procedure of Example 4, nona-1,6-diyne (852 mg, 7.1 mmol) was converted to the nonadiynylmagnesium bromide and reacted with 4-bromocrotonic acid (3 mmol) at 20° for 30 minutes. Isolation of the product gave tridec-2t-en-5,10-diynoic acid (492 mg), m.p. 60–61.5° of purity 94%, determined by conversion of a sample to the methyl ester with diazomethane. Recrystallisation from a mixture of light petroleum and ether in equal proportions at −50° gave acid of m.p. 63°–64° and purity 95%.

EXAMPLE 8

A solution of deca-1,4-diyne (17.0 g, 127 mmol) in THF (25 ml) was added dropwise to a stirred solution (99 ml) of ethylmagnesium bromide (127 mmol) in THF and the mixture stirred for 5 minutes at 0° under nitrogen. Cuprous cyanide (300 mg) was added, the mixture stirred and cooled in ice and a solution of 4-bromocrotonic acid (9.1 g, 55 mmol) in THF (10 ml) was added dropwise. After stirring for 30 minutes at 0°, the temperature was allowed to rise to 20° and stirring was continued for another 30 minutes. The reaction mixture was acidified by adding N sulphuric acid and water and extracted with ether: the ether extracts were washed with 2N aqueous ammonia solution to extract the product acid and the ammoniacal extracts acidified and re-extracted with ether; the washed and dried ether extracts were evaporated and the residue twice recrystallised from light petroleum to give tetradec-2t-en-5,8-diynoic acid (6.8 g), m.p. 53°–55°, raised to 58° after a further crystallisation from ethanol.

EXAMPLE 9

Using the procedure of Example 8, trideca-1,4,7-triyne (22.6 g, 132 mmol) in THF (25 ml) was reacted with ethylmagnesium bromide (132 mmol) in THF solution (75 ml), and the alkatriynylmagnesium bromide formed was reacted in the presence of cuprous cyanide (300 mg) with 4-bromocrotonic acid (9.4 g, 57 mmol) in THF (20 ml), with stirring for 4 hours at 0°. Recrystallisation of the residue from the evaporated ether extracts twice from light petroleum and twice from aqueous ethanol gave heptadec-2t-en-5,8,11-triynoic acid (5.9 g), m.p. 82°–83°.

Preparation of hexadeca-1,4,7,10-tetrayne

A THF solution (143 ml) containing ethylmagnesium bromide (200 mmol) was added at 0° to a solution of trideca-1,4,7,-triyne (34.6 g, 200 mmol) in THF (25 ml), the mixture stirred for 10 minutes, cuprous cyanide (500 mg) added, and the mixture stirred for a further 5 minutes. Propargyl bromide (24 g, 200 mmol) in THF (25 ml) was added dropwise at 0° and the mixture stirred for 15 minutes. Ether was added, followed by a saturated solution of ammonium chloride, the layers separated and the aqueous layer ether-extracted. The combined ether layers were washed with 2N aqueous ammonia solution until free from copper and then with saturated ammonium chloride solution until neutral, and dried and evaporated to give hexadeca-1,4,7,10-tetrayne (42.2 g). Distillation of this gave the pure compound (18 g, 97% purity), b.p. 103°–105°/0.001mmHg. Precautions should be taken on distilling this compound, as it is liable to disintegrate.

EXAMPLE 10

A THF solution (10.4 ml) containing ethylmagnesium bromide (14.3 mmol) was added dropwise at 0° to a solution of hexadeca-1,4,7,10-tetrayne (3.0 g, 14.3 mmol) in THF (5 ml), and after stirring at 0° for 10 minutes cuprous cyanide (200 mg) was added and stirring continued for 5 minutes. A solution of 4-bromocrotonic acid (1.0 g, 6.2 mmol) in THF (5 ml) was then added dropwise at 0° and stirring continued for 30 minutes. Dilution with ether and acidification with N sulphuric acid, followed by extraction with ether and washing of the combined ether layers with saturated aqueous ammonium chloride solution, gave on evaporation of the dried ether extracts a residue. This residue was dissolved in light petroleum and the solution extracted with 2N ammonia solution in aqueous methanol containing 3 volumes of methanol to 1 of water. The aqueous methanolic layer was acidified with 4N sulphuric acid and extracted with light petroleum: the extracts were washed with saturated ammonium chloride solution, dried and evaporated to give eicos-2t-en-5,8,11,14-tetraynoic aicd (1.5 g), which was purified by recrystallisation from ethanol at −20°, giving the pure acid, m.p. 83°–84°.

EXAMPLE 11

A solution of 3-methoxypropyne (17.5 g, 250 mmol) in THF (50 ml) was added to a THF solution (100 ml) containing ethylmagnesium bromide (250 mmol) at 0°, the mixture was stirred for 45 minutes at 22°, and stirring continued for 15 minutes. The mixture was cooled to 0° and a solution of 4-bromocrotonic acid (16.5 g, 100 mmol) in THF (50 ml) at 0° added, and the mixture stirred after addition for 2 hours at 22°. Ether (50 ml) was added, followed by 2N hydrochloric acid, the layers were separated and the aqueous layer extracted with ether: the combined ether layers were washed with a saturated aqueous ammonium chloride solution, dried and evaporated to give 7-methoxyhept-2t-en-5-ynoic acid (15.4 g, purity 83% by GLC): it crystallised from a mixture of ether and light petroleum at −75° to give the pure acid (10.8 g), m.p. 56°–58°.

EXAMPLE 12

A THF solution containing 1.56 mmol ethylmagnesium bromide per ml (14.75 ml) was added dropwise to a stirred solution of 3-(2'-tetrahydropyranyl)oxy-1-propyne (3.2 g, 23 mmol) in THF (5 ml), the mixture heated under reflux for 1 hour, and cuprous cyanide (250 mg) added and the mixture cooled to −30°. 4-Bromocrotonic acid (1.65 g, 10 mmol) in THF (10 ml) at −30° was added and after 2½ hours the product was isolated by acidification with 2N sulphuric acid, extraction with ether, washing the extracts with 2N ammonia solution, followed by acidification of the washings and re-extraction with ether, drying and evaporation, to give 7-(2'-tetrahydropyranyl)oxyhept-2t-en-5-ynoic acid (1.82 g, purity 83% by GLC).

EXAMPLE 13

A THF solution (43 ml) of ethylmagnesium bromide (55.6 mmol) was added to a solution of 6-methoxyhexa-1,4-diyne (60 g, 55.6 mmol) in THF (20 ml) at 0°. The mixture was stirred for 45 minutes at 25°, cuprous cyanide (200 mg) was added, and the mixture stirred for a further 15 minutes.

To 4-bromocrotonic acid (7.4 g, 45 mmol) in THF (20 ml) was added at 0° a THF solution (31 ml) of ethylmagnesium bromide (40 mmol) in order to convert the carboxylic acid to its Grignard salt. The resulting solution was added at 0° to the 6-methoxyhexa-1,4-diynylmagnesium bromide solution and stirring was continued for 2 hours at 5°–10°. The product was isolated by the procedure of Example 8, giving 10-methoxydec-2t-en-5,8-diynoic acid (10.5 g, purity 55%), which was crystallised from ether and light petroleum at −75° to give the pure acid (5.5 g), m.p. 67°–69°.

EXAMPLE 14

Ethylmagnesium bromide (0.92 mol) as a THF solution (682 ml) was added to 6-(2'-tetrahydropyranyl)oxyhexa-1,4-diyne (164 g, 0.92 mol) in THF (80 ml) at −5° during 90 minutes with stirring. Cuprous cyanide (900 mg) was added and the mixture stirred for 2 hours at −5°, and added to 4-bromocrotonic acid (66 g, 0.4 mol) in THF (400 ml) at −5° during 50 minutes, and stirring was continued for 3 hours. N sulphuric acid (800 ml) was added at −10° and the mixture diluted with water (200 ml) and extracted with ether. The ether extracts were washed with saturated aqueous ammonium chloride solution and the acid fraction of the products was extracted with 2N aqueous ammonia: the ammonia salts were reacidified, re-extracted with ether and the dried ether extracts gave on evaporation crude 10-(2'-tetrahydropyranyl)oxydec-2t-en-5,8-diynoic acid (82 g).

The tetrahydropyranyl group was subsequently removed by treatment at ambient temperature with 25% aqueous sulphuric acid (20 ml) and methanol (100 ml) for 15 minutes, and the product isolated by pouring the mixture into water (500 ml), extracting with ether; the residue (63 g) from evaporation of the dried ether extracts was taken up in ether (100 ml), light petroleum (200 ml) added, and the precipitated acid crystallised from a mixture of acetone and benzene to give 10-hydroxydec-2t-en-5,8-diynoic acid (11 g, purity 93.4%). Pure material of m.p. 97°–100° was obtained by further recrystallisation. Further product (9 g) was recovered from the ether-light petroleum solution by chromatography on silica gel using iso-octane-ether mixtures as eluents.

EXAMPLE 15

A solution of 3-methoxypropyne (10.5 g, 150 mmol) in THF (50 ml) was added to a THF solution (100 ml) containing ethylmagnesium bromide (150 mmol) at 0°, the mixture stirred for 45 minutes at 22°, cuprous cyanide (300 mg) added, and stirring continued for 15 minutes. The mixture was cooled to −5° and a solution of methyl 4-bromocrotonate (17.9 g, 100 mmol) in THF (50 ml) added, and the mixture stirred for 2 hours at −5°. Ether (50 ml) was added, followed by a saturated aqueous solution of ammonium chloride, and the mixture extracted with ether, the extracts washed with ammonium chloride until free from traces of copper: the dried and evaporated ether solution gave as residue methyl 7-methoxyhept-2t-en-5-ynoate (16.3 g, purity 74% by GLC).

EXAMPLE 16

A solution of 6-methoxyhexa-1,4-diyne (16.2 g, 150 mmol) in THF (50 ml) was added to a THF solution (100 ml) containing ethylmagnesium bromide (150 mmol) at 0°, the mixture stirred for 10 minutes, cuprous chloride (300 mg) was added, and stirring continued for 5 minutes. Methyl 4-bromocrotonate (19.7 g, 110 mmol) in THF (50 ml) was added to the Grignard reagent, and stirring continued at 0° for 4½ hours. The product was isolated as described in Example 15, yielding methyl 10-methoxydec-2t-en-5,8-diynoate (23.4 g, purity 48% by GLC). A portion (19.7 g) was distilled to give purified ester (2.6 g, purity 93%), b.p. 109°–113°/0.01 mm Hg.

Preparation of 7-bromohept-2t-en-5-ynoic acid

To the 7-(2'-tetrahydropyranyl)oxy-hept-2t-en-5-ynoic acid product of Example 12 (2.2 g, 10 mmol) in ether (7.5 ml) was added pyridine (0.25 ml), the solution was cooled in an icebath and a solution of phosphorus tribromide (2.0 g, 7 mmol) in ether (5 ml) was added; stirring was then continued at ambient temperature for 7 hours: N hydrochloric acid (5 ml) was added and stirring continued for 15 minutes, and the mixture was saturated with ammonium chloride and ether-extracted. The ether extracts were washed with brine, dried over anhydrous magnesium sulphate and evaporated under reduced pressure to give 7-bromohept-2t-en-5-ynoic acid (2.0 g, 37% purity by GLC), as a yellow oil which was purified by crystallisation from carbon tetrachloride at −20°, (0.6 g, 80% purity).

EXAMPLE 17

A THF solution (10 ml) of ethylmagnesium bromide (11.6 mmol) was added dropwise to a stirred solution of trideca-1,4,7-triyne (2.0 g, 11.6 mmol) in THF (2.5 ml) at 0°: after 10 minutes cuprous cyanide (200 mg) was added and stirring was continued for 5 minutes. A solution of 7-bromohept-2t-en-5-ynoic acid (1.0 g, 5.0 mmol) in THF (5 ml) was then added dropwise and the solution stirred for 1 hour at 0°. Ether (25 ml) was added and the reaction mixture acidified to pH 3 with 2N sulphuric acid and extracted with ether: the ether extracts were washed with saturated ammonium chloride solution until they were neutral and the ether removed under reduced pressure. The residue obtained was dissolved in light petroleum (100 ml) and the solution extracted three times with 2N ammonia in aqueous methanol (25 ml, prepared from 3 volumes of methanol to 1 of water): the resulting aqueous methanol layer was acidified with 4N sulphuric acid and re-extracted with light petroleum, the extracts washed with a saturated solution of ammonium chloride, and dried and evaporated to give a solid residue (1.0 g, 68%). Recrystallisation from ethanol at −20° gave eicos-2t-en-5,8,11,14-tetraynoic acid (375 mg, 25%), m.p. 82°–83°.

Preparation of methyl 7-bromohept-2t-en-5-ynoate

To a solution of methyl 7-methoxyhept-2t-en-5-ynoate (13.1 g, 78 mmol, from Example 15) and anhydrous zinc bromide (0.5 g, 2.2 mmol) in dichloromethane (50 ml) was added dropwise at ambient temperature acetyl bromide (11.5 g, 93.5 mmol) in dichloromethane (50 ml). The reaction mixture was stirred at ambient temperature for 16 hours and ether and water added. The separated aqueous layer was ether extracted and the combined organic layers washed with saturated aqueous ammonium chloride solution, dried and evaporated, and the residue distilled to give methyl 7-bromohept-2t-en-5-ynoate (11.5 g, purity 89% by GLC), b.p. 70°–77° at 0.003 mm Hg.

EXAMPLE 18

To ethylmagnesium bromide (41 mmol) in THF (25 ml) was added dropwise at 0° trideca-1,4,7-triyne (7.0 g, 41 mmol) in THF (25 ml). After stirring at 0° for 10 minutes cuprous cyanide (100 mg) was added, followed by methyl 7-bromohept-2t-en-5-ynoate (5.9 g, 27.2 mmol) in THF (25 ml) dropwise at 0° and stirring continued for 30 minutes. Ether and saturated aqueous ammonium chloride were added, the aqueous layer ether-extracted, the combined ether layers washed with saturated ammonium chloride solution, and dried and evaporated. By chromatography of the residue on a silica column using ether-light petroleum mixtures followed by recrystallisation from such solvent at −50° there was obtained methyl eicos-2t-en-5,8,11,14-tetraynoate (3.5 g) as an oil.

Preparation of 10-bromodec-2t-en-5,8-diynoic acid

To 10-hydroxydec-2t-en-5,8-diynoic acid (16.4 g, 0.092 mol), from Example 14) and pyridine (2.8 ml) in ether (240 ml) at 0° was added phosphorus tribromide (17.3 g, 0.064 mol) in ether (30 ml) during 30 minutes: the mixture was stirred for 2 hours at ambient temperature and water (60 ml) then added. The separated ether layer was washed with water, dried and evaporated, the residue (14.8 g) crystallised from a mixture of benzene and light petroleum to give 10-bromodec-2t-en-5,8-diynoic acid (6.6 g, 74.8% purity by GLC), and chromatography provided a purer sample of the compound, m.p. 118°–121°.

EXAMPLE 19

A THF solution (45 ml) of ethylmagnesium bromide (68.6 mmol) was added to a stirred solution of deca-1,4-diyne (9.2 g, 69 mmol) in THF (10 ml) at −5° during 45 minutes, and stirring continued for 2 hours at −5°. Cuprous cyanide (130 mg) was then added and the mixture stirred for 30 minutes. The resulting Grignard reagent solution was added during 20 minutes to 10-bromodec-2t-en-5,8-diynoic acid (5.5 g, 22.8 mmol) in THF (10 ml) at −5°, and the red mixture stirred for 2 hours at 0° and 2N sulphuric acid (25 ml) then added at 10°, followed by water. The mixture was ether-extracted, the extracts washed with saturated ammonium chloride solution, dried and evaporated to give a residue (13.1 g), which was extracted with light petroleum and the insolubles recrystallised from ethanol to give eicos-2t-en-5,8,11,14-tetraynoic acid (4.3 g, purity 88% by GLC), m.p. 85.5°–87°.

What is claimed is:

1. A process for preparing an unsaturated carboxylic acid of the structure $RCH_2(C≡CCH_2)_m(CH_2)_nCH\stackrel{t}{=}CHCOOH$ of from 5 to 22 carbon atoms in the chain, where R is a monovalent aliphatic radical and $m$ is 0 or an integer from 1 to 5 and $n$ is 0 or an integer from 1 to 6, $n$ being 0 when $m$ is 0, comprising contacting a Grignard reagent RMgBr with an ω-halogeno-2t-enoic acid of the structure $BrCH_2(C≡CCH_2)_m(CH_2)_nCH\stackrel{t}{=}CHCOOH$ in an inert liquid medium whose temperature is restricted to below −20°C if in the reagents selected the bonds of the αcarbon atom of the group R are all single bonds and $m$ and $n$ are 0, and recovering from the medium the acid formed.

2. A process according to claim 1, wherein the halogeno-enoic acid is one in which $m$ and $n$ are 0.

3. A process according to claim 2, where R has a —$CH_2$— group at the α-position.

4. A process according to claim 1, where R has an αβ-acetylenic bond.

5. A process according to claim 2, where R has an αβ-acetylenic bond.

6. A process according to claim 5, where R is a group $R^1(CH_2C≡C)_p$ in which $R^1$ is an n-alkyl group and $p$ is from 1 to 5.

7. A process according to claim 5, where R is a group $R^2(CH_2C≡C)_g$ in which $R^2$ is an alkoxy or 2-tetrahydropyranyloxy group and $g$ is from 1 to 2.

8. A process according to claim 5, where R is a trideca-1,4,7-triynyl group and the halogeno-enoic acid is 7-bromohept-2t-en-5-ynoic acid.

9. A process according to claim 5, where R is a deca-1,4-diynyl group and the halogeno-enoic acid is 10-bromodec-2t-en-5,8-diynoic acid.

10. Eicos-2t-en-5,8,11,14-tetraynoic acid.

* * * * *